(12) United States Patent
Cunningham (10) Patent No.: US 6,349,249 B1
(45) Date of Patent: Feb. 19, 2002

(54) AUTOMATED GUIDED APPARATUS SUITABLE FOR TOPING APPLICATIONS

(75) Inventor: Peter D. Cunningham, Sudbury (CA)

(73) Assignee: Inco Limited, Toronto (CA)

( * ) Notice: Subject to any disclaimer, the term of this patent is extended or adjusted under 35 U.S.C. 154(b) by 0 days.

(21) Appl. No.: 09/515,299

(22) Filed: Feb. 29, 2000

(51) Int. Cl.$^7$ .................. G01C 11/00; G01C 5/00; G01C 19/00; G05D 1/00; G06F 3/00; G06F 9/00; G06F 17/00; G06F 19/00; G06F 165/00

(52) U.S. Cl. .................. 701/28; 701/25; 701/23; 701/200; 701/217; 701/209; 701/224; 701/207; 701/211; 701/220; 701/214; 318/580; 318/587; 382/153; 382/154; 382/155; 382/156; 382/152; 382/151; 180/116; 180/119; 180/167; 180/168; 180/169; 340/990

(58) Field of Search .................. 701/25, 217, 23, 701/200, 209, 224, 207, 211, 220, 214; 318/587, 580; 382/153, 154, 155, 156, 152, 151; 180/116, 119, 167, 168, 169; 340/990

(56) References Cited

U.S. PATENT DOCUMENTS

| 4,023,861 A | | 5/1977 | Schnell .................. 299/1 |
| 4,790,402 A | * | 12/1988 | Field et al. .................. 180/169 |
| 4,884,847 A | * | 12/1989 | Bessinger et al. .................. 299/1 |
| 5,155,684 A | * | 10/1992 | Burke et al. .................. 701/25 |
| 5,155,775 A | * | 10/1992 | Brown .................. 382/1 |
| 5,274,437 A | | 12/1993 | Hornyik .................. 356/376 |
| 5,493,499 A | | 2/1996 | Theurer et al. .................. 364/449 |
| 5,530,330 A | * | 6/1996 | Baiden et al. .................. 318/580 |
| 5,999,865 A | * | 12/1999 | Bloomquist et al. .................. 701/25 |

FOREIGN PATENT DOCUMENTS

| EP | 0487465 | | 11/1991 |
| JP | 6-35533 | * | 6/1994 |
| JP | 6-259130 | * | 6/1994 |

OTHER PUBLICATIONS

"Field Evaluation of the Modular Azimuth and Positioning System (Maps) for a Continuous Mining Machine", John J. Sammarco/1993.
"Two–Dimensional Mapping of Expansive Unknown Areas", Gary K. Shaffer, Oct. 1995.
Itran Corp., "Intelligent Visual Sensors/IVS".
Laser Ready News—vol. 90 No. 2, Feb. 1991.

\* cited by examiner

Primary Examiner—William A. Cuchlinski, Jr.
Assistant Examiner—Ronnie Mancho
(74) Attorney, Agent, or Firm—Edward A. Steen (57) ABSTRACT

An automated guided apparatus capable of accurately determining its position within a walled environment such as a mine or building. A mobile unit incorporating an inertial measurement unit and a gray scale vision system processor/camera and/or a laser pointer is able to initialize its location and then update its location within the environment. The apparatus is especially adapted for producing tunnel plan views ("TOPES") and also for guiding equipment through such environments.

58 Claims, 4 Drawing Sheets

AUTOMATED GUIDED APPARATUS SUITABLE FOR TOPING APPLICATIONS

TECHNICAL FIELD

The instant invention relates to surveying techniques in general and, more particularly, to an automated positioning apparatus especially suited for generating mine tunnel outline plan views.

BACKGROUND ART

Mine tunnel outline plan views ("TOPES") are required for underground mine planning. Present techniques require teams of skilled surveyors using conventional surveying techniques and equipment to physically traverse the topes and drifts to obtain the raw data for the topes. The raw data consists of point to point measurements. The data collected by the surveyors is imported into a CAD package to produce mine tunnel plan views.

Sending surveying crews into underground excavations can be dangerous and tedious work. Moreover, the assembling and utilization of highly skilled personnel contributes to the cost of underground mining.

Due to the ceaseless press of cost reduction and heightened safety concerns, there is a continuing desire on the part of hard rock miners to automate mining systems. By automating as many and minimizing cycles as possible, the dangers and expenses caused by the presence of personnel at the actual working zones of the mine may be reduced. By placing the miner or other mine professional in a safe and secure remote location, preferably at the surface, increased safety, cost efficiency and production are encouraged.

In particular, robotic mining techniques require dependable navigation and positioning systems. For surface mining (as well as other activities), increasing success has been found with the use of global positioning systems utilizing earth satellite navigation.

In underground mines and in certain surface structures, the signals from the orbiting satellites cannot reach the targeted equipment. Accordingly, sophisticated dead reckoning systems have been developed. Typical techniques utilize sound, electromagnetic means (lasers, visible light, radar) or gyroscopes or combinations thereof to remotely guide and-operate mobile underground equipment.

In particular, the coal mining industry has demonstrated encouraging results in employing automated mining equipment.

U.S. Pat. No. 4,023,861 discloses a tunneling machine having a gyroscope detector and a laser beam detector. The measured data maintains the heading of the machine as it cuts into the heading face.

U.S. Pat. No. 4,884,847 discloses, in a very broad fashion, a method for operating a robotic miner conveyor by, in part, comparing current and previously stored mine parameters. The patent also states that the invention, without providing too many details, can be used to map mines.

A difficulty with remotely operated equipment is securing an initial reference datum point in X-Y-Z space. Due to the relative complex location algorithms used in navigation systems, the jumping off point must be measured with great accuracy otherwise even small errors will quickly become magnified thereby throwing off the reconnoitering ability of the apparatus. This problem is especially onerous if a toping system is involved. Any deviation may render the resulting map worthless when critical parameters are at stake.

Accordingly, there is a need to produce less labor intensive accurate topes of underground excavations and enclosed structures.

SUMMARY OF THE INVENTION

There is provided a mobile automated positioning apparatus that is capable of accurately traversing and measuring an underground excavation or structure for topes and other applications.

The apparatus includes an inertial measurement unit, central processing unit, laser range finder, laser scanner, laser pointer, gray scale vision system and a mobile platform.

The apparatus is capable of accurately initializing its position and confidently traversing the location. As the apparatus trundles about, it collects data for accurate topes.

The invention is especially useful for underground tunnel surveying and building surveys. It also may be used for guiding other underground and surface vehicles.

PREFERRED EMBODIMENT OF TIE INVENTION

Figure 1:
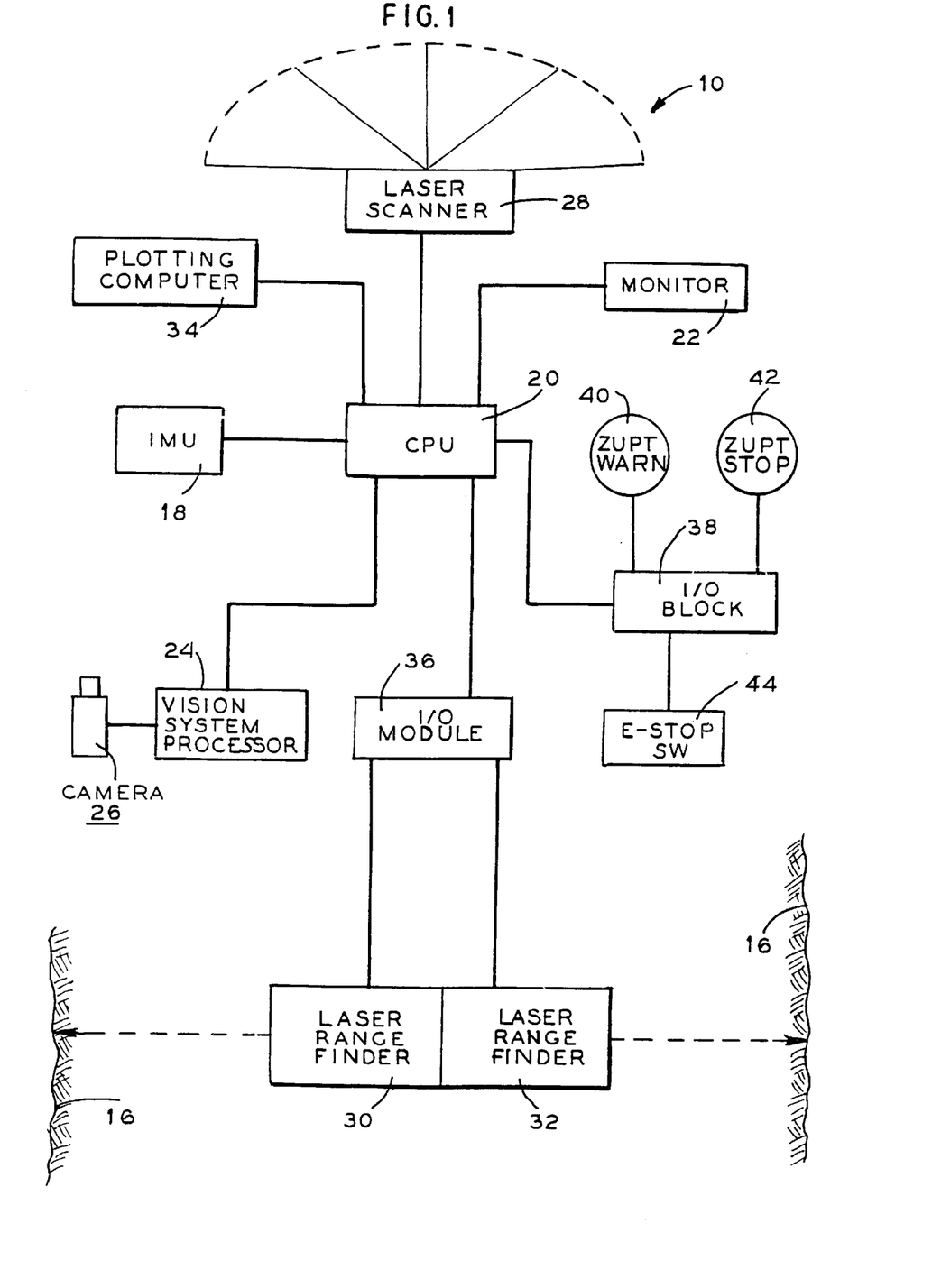
FIG. 1 is a schematic representation of an embodiment of the invention.

Referring to FIG. 1, there is shown a schematic diagram of a toping apparatus 10. The apparatus 10 is mounted on a self-propelled mobile platform 12. (See FIGS. 2 and 3).

The platform 12 may include an internal combustion motor or an electric motor (not shown). Any form of translation means (14), wheels or tracks, may be employed as long as the apparatus 10 may be steered as it travels through a mine heading 16.

The instant apparatus 10 is designed to delineate mine walls quickly and accurately. In optical surveying, the odolites measure angles very accurately. All initial points of measurement must be very accurate. If the recorded azimuth of the initial point, such as a plug, screw or other similar readily apparent and permanent locating device is off by even a fraction of a degree, all the subsequent measurements from that first point will acquire increasing errors.

Conventional survey techniques are also limited by the number of data points that define the walls of a drift. The number of measurements taken by surveyors will vary with the roughness of the walls of the heading 16.

Wherever there is a deviation in the shape of the wall, a measurement is taken.

As the relative importance of the area decreases, fewer physical measurements of, say, the back of the drift are taken since overbreak on the back is deemed unimportant.

With the automated system 10 disclosed herein, the walls of the drifts can be delineated in more detail in a fraction of the time when compared to standard manual techniques. By having quicker and more accurate toping measurements and plan views, all of the requisite services necessary for optimum mine development and operations are available to rock mechanics engineers as well as the ventilation engineers, electrical engineers, hydraulic engineers, etc.

In brief, the toping apparatus 10 is driven to a known initial position, the initial reference point ("IRP"). A positioner on the apparatus 10 detects the IRP and establishes its alignment bearings within the excavation 16. The platform 12 is then slowly driven through the heading 16 with the apparatus 10 periodically stoping the platform 12 to take in the appropriate measurements. After recording the parameters, the platform 12 continues to traverse the drift 16 until the measurement gathering process has been completed.

Since establishing the IRP for the apparatus 10 is probably the most critical measurement, a system has been devised to calibrate the initial position of the apparatus 10 thereby assuring the integrity of the subsequent measurements.

Figure 2:
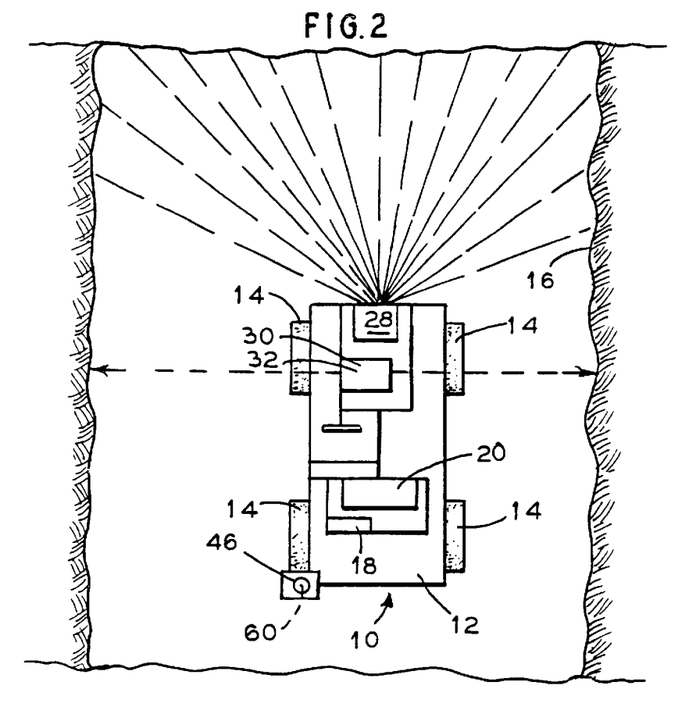
FIG. 2 is a plan view of an embodiment of the invention.
Figure 3:
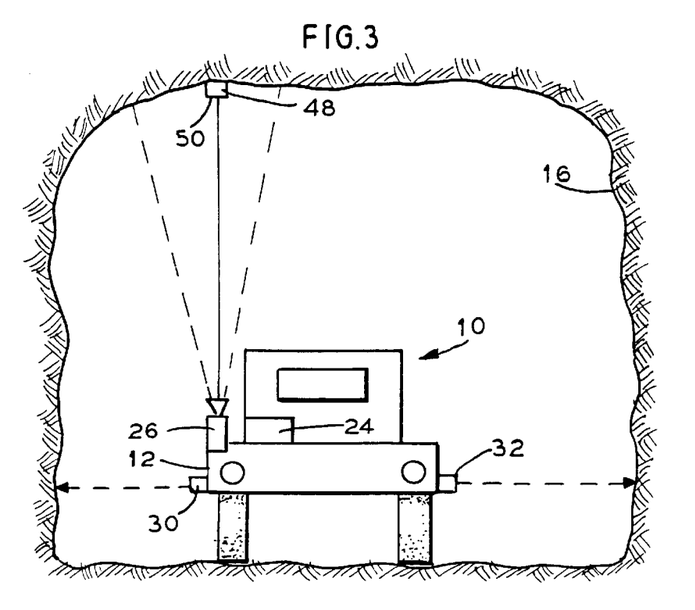
FIG. 3 is rear elevational view of an alternative embodiment of the invention.

Returning again to FIGS. 1, 2 and 3 the apparatus 10 is mounted on the mobile platform 12 and may include:

18—Inertial Measurement Unit ("IMU")
20—Central Processing Unit ("CPU")
22—Video Monitor
24—Vision System Processor
26—Video Camera
28—Proximity Laser Scanner
30—Laser Range Finder
32—Laser Range Finder
34—Plotting Computer
36—Input/Output ("I/O") Module
38—I/O Block
40—Zero-Velocity Update ("CZUPT") Warning Buzzer
42—ZUPT Stop Light
44—Emergency Stop Switch.
46—Laser Pointer The "brains" of the apparatus 10 is the IMU 18. In order to successfully navigate from one underground location to another the starting position must be known. Accordingly, a positioning system is required. Since external positioning and referencing positions cannot easily reach a mine's interior, a mounted gyroscopic navigation device is preferred to negotiate the excavation 16.

Due to the relatively irregular floor surface of a mine with boulders, ruts, contours, irregular surfaces, etc., it was determined that mechanical rotating mass gyroscopes, sophisticated as they are, may experience jarring and repeated vibrations eventually resulting in errors and physical breakage. Acting upon earlier U.S. Bureau of Mines research, it was determined that a ring laser gyroscope, with no moving parts and robust construction, could stand up to the rough usage envisioned for mine toping operations.

In brief, a ring laser gyroscope fires opposing laser beams over a closed triangular path. If the gyroscope is at rest, the two beams essentially cancel each other out resulting in a null state as detected by the appropriate sensors.

If the gyroscope is moved, the opposing beams are simultaneously slightly foreshortened or lengthened as the case may be resulting in a measurable differential phase change. Using the gyroscope manufacturer's proprietary software, the intelligence can be manipulated to measure the change in position in three dimensions along with the change in pitch, altitude, roll and azimuth. Highly sophisticated and accurate ring laser gyroscopes are used in military applications. Detuned systems are available for industrial and commercial usage.

In particular, Honeywell Inc. of St. Petersburg, Florida sells a strapdown civilian inertial measuring unit ("IMU") 18 employing a ring laser gyroscope called a Honeywell Ore Retrieval Tunneling Aid ("HORTA"™). The U.S. coal industry utilizes HORTA units in some underground continuous mining systems. These mining devices can be partially automated, allowing the operator to monitor a machine's progress from a more secure location. These coal machines are mainly concerned with azimuth whereas hard rock mining applications require azimuth and position.

In tests of a continuous mining machine utilizing an IMU, the data shows debilitating increasing errors that are typical for an IMU. Errors were also disturbingly compounded by vibrations. The errors calculated were 0.2 meter of easting error and 0.019 meter of northing error after thirty minutes of operation. After sixty minutes of operations, the errors had cascaded to 0.19 meters of easting error and 0.29 meter of northern error. As such, these errors are unacceptable for accurate toping measurements. For example, while some error in coal mining machine location may be tolerated because the heading is already developed and the machine is observed (and can be repositioned as necessary), errors on the order of 50 centimeters for two intersecting development hard rock drifts create (ore) grade difficulties and result in more costly mine development.

The instant invention overcomes the inherent drift errors in the IMU 18 to permit accurate traversing and toping measurements.

The hardware depicted in FIG. 1 are all connected with electrical communication means known to those in the art. Depending on the circumstances, the plotting computer 34 and/or the monitor 22 may be located in a remote location linked to the apparatus via appropriate underground rated RF or ethernet links. Moreover, if the monitor 22 is disposed at a remote location, say, at the surface of the mine, standard remote controls for driving the platform 12 disposed in proximity with the monitor 22 would permit the remote operator to safely guide and control the apparatus 10 within the excavation 16 from afar.

The IMU 18, used to measure changes in location from the known initial reference point, utilizes the Honeywell HORTA and its proprietary software to communicate with the CPU 20. In a working prototype toping apparatus 10, the CPU 20, which may be a personal computer, was a Versa Modular Eurocard™.

The CPU 20 acts as the interface between the operator and the IMU 18 and displays the status of the apparatus 10. The proximity laser scanner 28 determines distance between the vehicle 12 and a structural member, such as a wall of the heading 16. In a working prototype apparatus 10, a Getman™ trammer was used as the mobile vehicle 12. It is a two man, diesel powered, steerable, four wheel drive cart. The diesel engine induced typical vibrations found in underground machines. The four by four traction configuration allows the platform 12 to safely operate in rough surfaced drifts.

The vision system processor 24 utilizes an Itran™ Corporation (Manchester, N.H.) IVS™ gray scale detector and a CCD video camera 26 to ensure initial calibration of the IMU 18. Laser range finders 30 and 32 detect the distance and location of the walls of the heading 16 and may be used to supplement or replace the laser scanner 28.

In order to run the toping apparatus 10 and operate the assorted pieces of hardware, the following software packages were utilized:

A) Process Window™: man-machine interface software from Taylor Industrial Software (Edmonton, Alberta). This package displays on the monitor 22 the entire status of the apparatus 10 such as ZUPT's, heading settings, toping data, compass headings, status of data recordings, etc. B) Windows NT® (Microsoft Corporation, Redmond, Washington) manages the application. C) Dataview™ software (Pen Systems, Sudbury, Ontario) records the IMU 18 measurements. D) Autocad™ (Autodesk, Inc., San Rafael, Calif.) CAD design software processes the data into mine plans and topes. E) Waltz™ integrated PC controller software (Taylor Industrial Software) located in the CPU 20 performs and coordinates all high-speed control of machines and the associated processes.

In operation, the IMU 18 first requires an initial position fix, the IRP. In one embodiment, as shown in FIG. 2, a positioner such as a laser pointer 46 affixed to the vehicle 12 projects a downwardly pointing laser beam onto the ground. The apparatus 10 is first positioned with a plumb bob (not shown) so that the laser pointer 46 is directly and exactly over a known ground survey point 60. The coordinates of this known position 60 are then entered into the IMU 18 via the Dataview software. This procedure provides the IRP, the vehicle reference point ("VRP") and subsequent position updates. The IRP and the VRP may be one and the same.

Once the VRP coordinates are digested by the IMU 18 via the CPU 20, the IMU 18 begins to detect true north. Over a period of time ranging from 15 minutes to 25 minutes depending on the latitude of the location, the IMU 18 senses the earth's rotation and determines its location in three dimensional space responsive to the VRP. Because of the installed proprietary software, the entered coordinates of the vehicle 12 must be within very narrow tolerances of its actual location. Otherwise, the IMU 18 will be unable to compute and record its subsequent positions accurately. A small amount of inexactitude is tolerable by the IMU 18. However, unless careful attention is paid to getting the IRP right vis-à-vis the survey point 60, the subsequent results will be suspect.

Positioning a large bulky vehicle precisely over the known survey point 60 with the plumb bob and the laser pointer 46 is a difficult procedure requiring great skill of the operator, especially if he/she is remotely situated from the IRP. At best, spotting accuracy is four or five millimeters.

In a preferred alternative embodiment of the invention as shown in FIG. 3, a positioner comprising the vision system processor 24 and camera 26 allows the vehicle 12 simply to be positioned within the field of view of the camera 26. Instead of using the laser pointer 46 and carefully positioning the vehicle 12, the vision system processor 26 allows an acceptably broader inexact initial vehicle placement anywhere within reasonable sight of a known reference point 48. The vision system processor 24 will then calculate the exact location of the vehicle 12 and submit the coordinates to the CPU 20.

The known initial reference point 48 may be any marker such as a bolt/washer 50 driven into the back of the heading 16 whose coordinates are known.

The vision system processor 24 is preferably the Itran Model IVS version 2.4 gray scale vision sensor that is used to verify the presence and the exact location of the bolt/washer 50. The processor 24 translates the two dimensional image recorded by the camera 26 into a gray-scale image matrix that detects dimensions, edges and is able to identify object features.

As understood, the Itran processor 24 (or similar unit) was developed to optically scan products sequentially moving past a fixed site. Used for quality control purposes, the system measures dimensions, verifies tolerances and detects flaws in products as they are manufactured. For the instant invention, the processor 24 was adapted by the instant inventors to seek out the bolt/washer 50 as it comes into view.

The processor 24 is essentially a gray scale measuring system that looks for identified edges in its field of view. See FIG. 4. When it detects edges, the processor 24 conducts distance measurements between an arbitrary zero sitting comprising a first stored edge and the second edge of the received object. The width of the locking bolt/washer 50 is a known constant. As a consequence, an edge of the bolt/washer 50 may be stored as a previously identified value. By measuring the distance between the known bolt/washer edge location and the camera's field of view center 52 (a type of edge), differential "X-Y offset" distances may be determined. When the difference between the previously identified value, in this case the selected parameter edge distance, and the X offset and the Y offset become zero, a match is made and confirmed.

Figure 4:
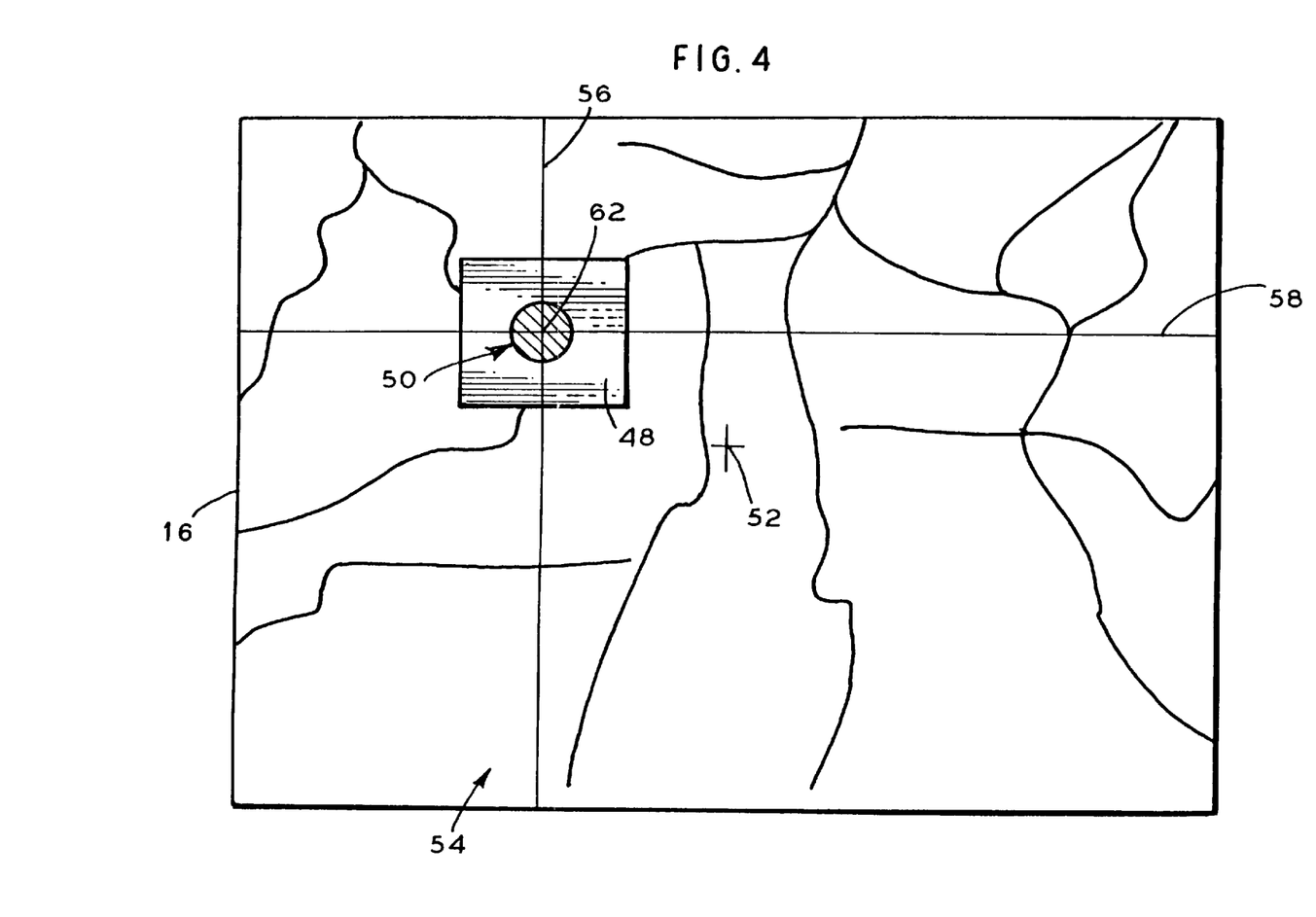
FIG. 4 is a representative of an optical feature of an embodiment of the invention.

If the field of view 54 of the camera 26 is for example, 64 cm×48 cm (at a distance of 4 meters), the driver need only stop the vehicle 12 under the bolt 50 or over or next to a known point within that area. The vision system 12 has a resolution of 640 pixels by 480 pixels and through interpolation can measure within 1/32 of a pixel. Therefore, the high resolution image is 20,480 by 15,360 subpixels. This will give a 2 dimensional accuracy of approximately 0.03 mm.

The position of a fixed point feature at the center of the field of view 52 of the camera 26 will be referenced to the IMU 18. This point will be referenced via lever arms. These lever arms will be stored in the IMU 18. The IMU 18 will then report position from the center of the camera field of view 54. The vision system 24 then reports position relative to the survey point (bolt/washer 50) and the CPU 20 will convert the pixel based offset coordinates to real world coordinates using a direction cosine matrix algorithm.

The orientation of the camera 26 and relative position to the IMU 18 are important to the accuracy of the system. The apparatus 10 should measure the distance from the target, azimuth, pitch and roll and determine a three dimensional offset. This will remove any misalignment errors introduced by having the vehicle 12 and the camera 26 stopped on uneven ground.

FIG. 4 is a representative view of what the camera 26 "sees". The vehicle 12 is parked under the bolt/washer 50 (or adjacent to any other fixed distinguishable object). The center 52 of the camera field 54 need not be directly on the object 50. This capability permits a greater margin of inexactitude than the laser pointer 46.

The vision system 24 uses edge detection to find objects within the field of view 54. Edge detection is a contrast in gray scale values in an image. Because of a difference in gray-scale values in pixels between the roof bolt/square washer 50 and the surrounding rock 16, an edge pixel is generated. Common gray scale values are then combined by the proprietary Itran software to create a recognized feature which in this example is the bolt/washer 50. A software algorithm called a dimension sensor then measures the width, center location of the features or the distance from a fixed point to the feature. In FIG. 4, the vertical line 56 represents the X position cursor whereas the horizontal line 58 represents the Y position cursor. The calculated distance between the intersection 62 of the horizontal and vertical axes 58 and 56 and the center of the camera field 52 represents an initial offset factor so as to enable the IMU 18 to orient itself in space. This offset factor permits the driver of the vehicle 12 to initialize the apparatus 10 location without the need to exactly position the vehicle 12 under the known IRP 48. The positioner, as shown in the embodiment depicted in part in FIG. 2 including the laser pointer 46 and known survey point 60 may be replaced by the more forgiving positioner as shown in the embodiment of FIG. 3.

It should be understood that whether the laser pointer 46 is used or the vision system 24 is used (or combinations of both), the remainder of the apparatus 10 and associated method are common to both embodiments. Essentially the vision system 24 is easier to start with for positioning the apparatus 10 vis-à-vis the IRP although both embodiments accomplish the same tasks.

After the apparatus 10 knows where it is located, the IMU 18 proceeds to survey its domain. As the vehicle 12 is driven, the IMU 18 collects data, calculates and then records its change in position with the HORTA IMU 18. After fifty seconds of movement a zero velocity update ("ZUPT") warning occurs via I/O block 38. The warning buzzer 40 advises the operator to stop the vehicle 12. At this point the IMU 18 performs a ZUPT. If the warning buzzer 40 is ignored, a ZUPT stop request 42 is lit and a vehicle stop submode is activated. Apparently, the IML 18 must update its position every sixty seconds at a maximum otherwise the position data becomes degraded. During the stop period, the IML 18 senses no motion and a ZUPT occurs. Alignment errors are corrected. ZUPT's last for five seconds wherein true north is determined through the gyroscopic action and the manufacturer's proprietary algorithms.

Since errors are bound to creep into the operation, because of vibrations, short ZUPT periods, and cycling periods extending close to or beyond the sixty second window, Honeywell has developed a number of countermeasures. It is recommended that frequent short stationary breaks be taken so that numerous ZUPTS will occur. With more ZUPTS per unit block of time, additional alignment errors may be filtered out.

The aforementioned software is loaded into the CPU for vehicle 12 locomotion and space determination. The IMU 18 software interface is compatible with the Waltz program. The IMU input/out ("I/O") driver 36 uses an analogy of a standard programmable logic controller ("PLC") language to control the IMU 18 and to access data directly from the IML 18.

While the IMU 18 is continuously orientating itself in space, the laser scanner 28 or the laser range finders 30 and 32, acting as distance measuring devices between a site on the moving toping apparatus 10 and the walls and ceiling of the heading 16, cause the CPU 20 to record survey points.

It has been determined that the laser range finders 30 and 32 may be better at determining survey points than the scanner 28 because they appear to operate faster. By utilizing distancing and data correction software employing cosine/sine functions, the distance measuring units (28 or 30/32) in known attitudes can calculate the coordinates of the survey points and submit the data via the Waltz controller software to the plotting computer 34. Assignee can provide the requisite copyrighted software.

Dataview collection software collects the data from the CPU 20, i.e., range finder 30 and 32 data, (laser scanner 28 data) and the position coordinates from the Waltz software to initiate the tope outlines as plotted by the computer 34.

A test was undertaken to determine the efficacy of the instant invention 10. A confirmation test of two plugs located in Inco's Creighton Mine shaft in Sudbury, Ontario was conducted with satisfactory results. The two plugs (similar to bolt/washer 50) were disposed in a drift off 3 shaft ramp.

Conversions for correcting the IMU 18 coordinates to Creighton Standard Mine ("CSM") coordinates had to be researched and implemented before any comparisons could be made.

The Universal Transverse Mercator ("UTM") is a standard mapping grid system based on known mercator projections that the HORTA IMU 18 reports positions in. It generates a Northing, Easting and Altitude in the UTM coordinate system.

UTM is in the metric system. However, since many mines are already plotted using English measurements, it is necessary to convert to the metric UTM coordinate system to the English unit Modified Basin System ("MBS").

The following conversion equations were used and installed into the CPU 20: Conversion Equations: $\phi=0°02'45.8''$ Conversion from MBS to UTM Northing UTM=[0.99984824(Northing$_{MBS}$ COS$\phi$−Easting$_{MBS}$ SIN$\phi$)+16500503.823]*0.304709550855 Easting UTM={[0.99984824(Easting$_{MBS}$ COS$\phi$−Northing$_{MBS}$ SIN$\phi$)+588365.738]*0.304709550855}+500000

Conversion from UTM to MBS

Northing MBS=(Northing$_{UTM}$ COS$\phi$−Easting$_{UTM}$ SIN $\phi$)−16503965.118 Easting$_{MBS}$=(Eastingu$_{UTM}$COS$\phi$−Northing-u$_{UTM}$SIN $\phi$)+1216196.80405

The actual collection of the data using the toping apparatus 10 took only one and a half hours. In comparison, over a weekend two crews of three surveyors each traversed the same ground to the plugs. The resulting sets of coordinates were very close as can be seen in Table 1.

TABLE 1

Difference between known Coordinates and IMU coordinates (in CSM)

| Loc. 1–Loc. 2 | Δ Easting | Δ Northing | Δ Elevation |
|---|---|---|---|
| Conventional | −0.14 | 0.84 | — |
| IMU | −0.04 | 1.47 | 4.70 |

For toping operations, the following types of data is collected directly by the IMU 18.

Northing

Easting

Altitude

Pitch

Roll

Azimuth

Time of measurement of the coordinates

Vehicle distance from the mine walls.

It is useful to present the data in the following graphical form:

| Location | Northing UTM | Easting | Altitude | Pitch (degrees) | Roll | Azimuth | Time | Distance left | for m right |
|---|---|---|---|---|---|---|---|---|---|
| 1 | | | | | | | | | |
| 2 | | | | | | | | | |
| 3 | | | | | | | | | |
| 4 | | | | | | | | | |
| 5 | | | | | | | | | |
| 6 | | | | | | | | | |

The data may be collected electronically using the CPU 20. The data may be stored in *.dbf aznd *.txt file formats using the Dataview software. The results from each run along with the daily analysis may be represented in a daily log, accessible on Lotus Notes™ (IBM. Armonk, N.Y.) in a directory.

Alternatively, data from the laser rangefinders 30 and 32 (and/or scanner 28) may be collected using the Waltz software to ensure data synchronization and at high a data collection speed as possible. Initial estimates are that the laser rangefinders 30 and 32 and position/attitude data can be collected at 320 m Sec intervals. If the vehicle 12 is traveling at 1 m/sec (3.6 km/hr) it appears that the apparatus 10 will achieve a resolution of approximately 30 cm.

The data may be analyzed using the appropriate statistical tools (for example, t square when analyzing repeatability). The main method of analysis will remain direct comparison by finding the average deviation. Excel™ (Microsoft) spreadsheets and graphs can be used to display the raw and analyzed data.

Figure 5:
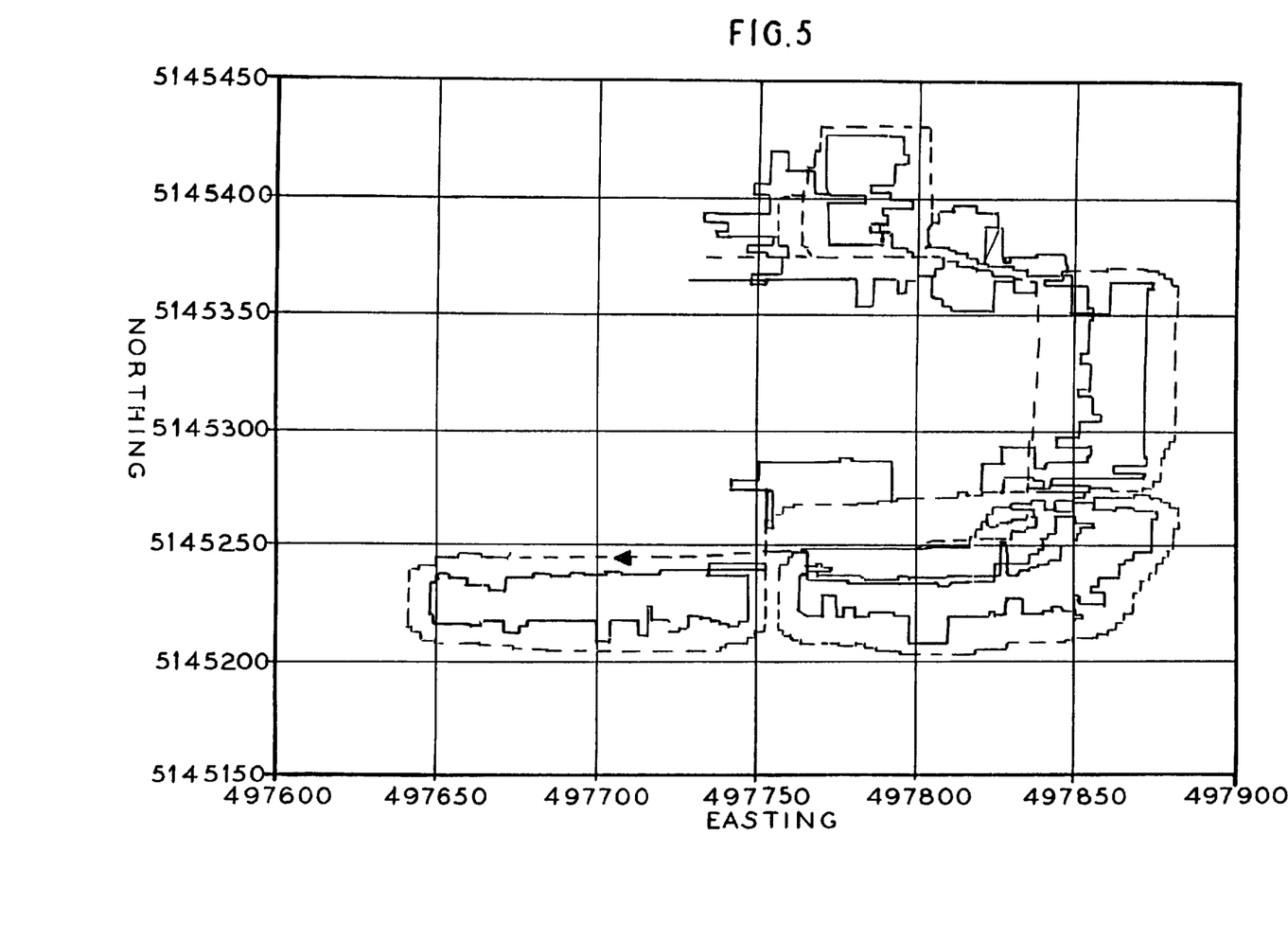
FIG. 5 is an example of a partial tope.

The toping apparatus 10 was used to produce at experimental building outline of the Kelly Lake Road Industrial Park in Copper Cliff, Ontario. See FIG. 5. The apparatus 10 only looked left. The vehicle 10 was driven slowly with the requisite stops for ZUPT's. The dashed line represents the path of the apparatus 10 whereas the solid line represents the outlines of buildings as the apparatus 10 looked left. More detailed views are possible when the IMU 18 looks in varying directions. However, FIG. 5, which is a preliminary tope, demonstrates the power of the apparatus 10.

For redundancy, the positioner may include both the laser pointer 46 and the vision system processor 24 and camera 26. By placing both sets of components on the vehicle 12, it is possible to drive the apparatus 10 to the starting site, approximately position the vehicle 12 over the survey point 60 with the pointer laser 46 and then energize the vision system processor 24 and camera 26 under the known initial reference point 48 to obtain an IRP having solid integrity.

Although the above discussion primarily relates to an IMU 18 based toping apparatus on a utility vehicle 12, the underlying inventive 10 concept can be miniaturized so that a person walking in an accessible area could quickly and accurately generate a tope. Moreover, the instant automated concept 10 may be applied for use with other types of autoguided machines, such as development jumbos, production drills, explosive loaders, robots, trucks, scoop trains, loaders, etc.

While in accordance with the provisions of the statute, there are illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. An automated guidance and measuring apparatus, the apparatus comprising a support disposed in an environment, a multi-dimensional location determinator affixed to the support, at least one distance measuring unit capable of the determining the distance between a site on the support and a spaced structural member of the environment, a vision system processor for locating a predetermined object in proximity of the apparatus within an acceptable margin of inexactitude and for initially determining the location of the apparatus in the environment, a central processing unit intelligence coordinator communicating with the multi-dimensional location determinator and the distance measuring unit and the vision system processor, means for continuously updating and determining the location of the apparatus in response to the multi-dimensional location determinator, and an image receiver connected to the vision system processor.

2. The apparatus according to claim 1 wherein the multi-dimensional location determiinator is an inertial measurement unit.

3. The apparatus according to claim 2 including a gyroscope.

4. The apparatus according to claim 3 including a ring laser gyroscope.

5. The apparatus according to claim 1 wherein the support is mobile.

6. The apparatus according to claim 1 wherein the distance measuring unit is selected from the group consisting of a laser scanner and a laser range finder.

7. The apparatus according to claim 1 wherein the vision system processor includes a gray scale field of view edge coordinate finder.

8. The apparatus according to claim 7 including a video camera connected to the gray scale field of view edge coordinate finder.

9. The apparatus according to claim 1 including means for obtaining physical measurements of the environment.

10. The apparatus according to claim 1 including a tope generator communicating with the apparatus.

11. The apparatus according to claim 1 communicating with an underground mining device.

12. The apparatus according to claim 1 including a zero velocity update status indicator.

13. The apparatus according to claim 1 including a remotely operated mobile platform.

14. The apparatus according to claim 12 including means for initiating an apparatus advisory indicator.

15. A method for measuring and navigating a mobile platform through a predetermined area having at least one surface, the method comprising:

a) providing the mobile platform with an inertial measurement unit;

b) causing the inertial measurement unit to communicate with a central processing unit, the central processing unit capable of storing and updating location parameters of the predetermined area;

c) determining a distance between the mobile platform and a surface of the predetermined area and introducing the distance to the central processing unit;

d) utilizing a gray scale field of view edge coordinate finder to detect a known marker in the predetermined area to determine an initial location of the mobile platform within an acceptable margin of inexactitude;

e) entering physical coordinates related to the initial location of the mobile platform into the central processing unit, f) causing the mobile platform to move through the area at a rate to enable the inertial measurement unit to determine the then current location of the mobile platform in the area;

g) storing and updating the then current location parameters of the predetermined area to the central processing unit; and h) determining, measuring and noting selected dimensional characteristics of the predetermined area.

16. The method according to claim 15 including generating a tope of the predetermined area by periodically reviewing the selected dimensional characteristics in the central processing unit.

17. The method according to claim 15 wherein the inertial navigation unit is a gyroscope.

18. The method according to claim 17 wherein the gyroscope is a ring laser gyroscope.

19. The method according to claim 15 wherein a video camera communicating with the gray scale field of view edge coordinate finder is caused to view the known marker on the surface of the predetermined area.

20. The method according to claim 19 wherein the gray scale field of view edge coordinate finder and the inertial measurement unit operate in tandem to determine the initial location of the mobile platform by referencing a fixed point feature at the center of the field of view of the video camera by lever arms, storing the lever arms in the inertial measurement unit, reporting a first position from the center of the video camera's field of view, reporting a second position relative to the known marker in the field of view of the video camera, the first position and second position recorded in at least pixel based coordinates, determining a pixel based offset coordinate between the first position and the second position, and converting the pixel based offset coordinate to real world dimensional coordinates.

21. The method according to claim 15 utilized in conjunction with the operation of mining equipment.

22. The method according to claim 15 utilized in conjunction with a movable vehicle.

23. The method according to claim 15 including initiating at least one zero velocity update.

24. The method according to claim 15 carried out in a structure.

25. The method according to claim 24 carried out in an underground excavation.

26. The method according to claim 15 including providing an advisory indicator.

27. An automated apparatus, the apparatus comprising a support disposed in an environment, a multi-dimensional location determinator affixed to the support, at least one distance measuring unit capable of the determining the distance between a site on the support and a spaced structural member of the environment, at least one positioner for locating a predetermined marker in proximity of the apparatus within an acceptable margin of inexactitude and for initially determining the location of the apparatus in the environment, a central processing unit intelligence coordinator communicating with the multi-dimensional location determinator and the distance measuring unit, means for continuously updating and determining the location of the apparatus in response to the multi-dimensional location determinator, and an image receiver connected to the vision system processor.

28. The apparatus according to claim 27 wherein the multi-dimensional location determinator is an inertial measurement unit.

29. The apparatus according to claim 27 including a gyroscope.

30. The apparatus according to claim 29 including a ring laser gyroscope.

31. The apparatus according to claim 27 wherein the support is mobile.

32. The apparatus according to claim 27 wherein the distance measuring unit is selected from the group consisting of a laser scanner and a laser range finder.

33. The apparatus according to claim 27 wherein the positioner includes a vision system processor, the vision system processor communicating with the central processing unit intelligence coordinator.

34. The apparatus according to claim 33 wherein the vision system processor includes a gray scale field of view edge coordinate finder.

35. The apparatus according to claim 34 including a video camera connected to the gray scale field of view edge coordinate finder.

36. The apparatus according to claim 27 wherein the positioner includes a laser pointer.

37. The apparatus according to claim 36 including means for entering initial reference point coordinates into the central processing unit intelligence coordinator.

38. The apparatus according to claim 27 including means for obtaining physical measurements of the environment.

39. The apparatus according to claim 27 including a tope generator communicating with the apparatus.

40. The apparatus according to claim 27 communicating with an underground mining device.

41. The apparatus according to claim 27 including a zero velocity update status indicator.

42. The apparatus according to claim 27 including a remotely operated mobile platform.

43. The apparatus according to claim 39 including means for initiating an apparatus advisory indicator.

44. The apparatus according to claim 27 wherein the positioner includes a vision system processor, a camera connected to the vision system processor, the vision system processor including a gray scale field of view edge coordinate finder, and a laser pointer.

45. A method for measuring and navigating a mobile platform through a predetermined area having at least one surface, the method comprising:

a) providing the mobile platform with an inertial measurement unit;

b) causing the inertial measurement unit to communicate with a central processing unit, the central processing unit capable of storing and updating location parameters of the predetermined area;

c) determining a distance between the mobile platform and a surface of the predetermined area and introducing the distance to the central processing unit;

d) utilizing a positioner to detect at least one known marker in the predetermined area to determine an initial location of the mobile platform within an acceptable margin of inexactitude;

e) entering physical coordinates related to the initial location of the mobile platform into the central processing unit, f) causing the mobile platform to move through the area at a rate to enable the inertial measurement unit to determine the then current location of the mobile platform in the area;

g) storing and updating the location parameters of the predetermined area to the central processing unit; and h) determining, measuring and noting selected dimensional characteristics of the predetermined area.

46. The method according to claim 45 including generating a tope of the predetermined area by periodically reviewing the selected dimensional characteristics in the central processing unit.

47. The method according to claim 45 wherein the inertial navigation unit is a gyroscope.

48. The method according to claim 47 wherein the gyroscope is a ring laser gyroscope.

49. The method according to claim 45 wherein a camera connected to the mobile platform and communicating with a gray scale field of view edge coordinate finder is caused to view the known marker.

50. The method according to claim 49 wherein the gray scale field of view edge coordinate finder and the inertial measurement unit operate in tandem to determine the initial location of the mobile platform by referencing a fixed point feature at the center of the field of view of the video camera by lever arms, storing the lever arms in the inertial measurement unit, reporting a first position from the center of the video camera's field of view, reporting a second position relative to the known marker in the field of view of the video camera, the first position and second position recorded in at least pixel based coordinates, determining a pixel based offset coordinate between the first position and the second position, and converting the pixel based offset coordinate to real world dimensional coordinates.

51. The method according to claim 45 wherein a laser pointer connected to the mobile platform assists in positioning the mobile platform vis-a-vis the known marker.

52. The method according to claim 45 utilized in conjunction with the operation of mining equipment.

53. The method according to claim 45 utilized in conjunction with a movable vehicle.

54. The method according to claim 45 including initiating at least one zero velocity update.

55. The method according to claim 45 carried out in a structure.

56. The method according to claim 55 carried out in an underground excavation.

57. The method according to claim 45 including providing a method advisory indicator.

58. The method according to claim 45 wherein a laser pointer connected to the mobile platform assists in positioning the mobile platform vis-à-vis a known first marker, a vision system processor, a carnera connected to the mobile platform and communicating with the vision system processor, assists in positioning the mobile platform vis-à-vis a known second marker.

* * * * *

UNITED STATES PATENT AND TRADEMARK OFFICE
CERTIFICATE OF CORRECTION

PATENT NO. : 6,349,249 B1
DATED : February 19, 2002
INVENTOR(S) : Peter D. Cunningham It is certified that error appears in the above-identified patent and that said Letters Patent is hereby corrected as shown below:

<u>Title page,</u>
Item [63], under U.S. Related Application Data, -- continuation-in-part of application 09/065,880, filed on April 24, 1998, now abandoned. --

Signed and Sealed this

Thirteenth Day of August, 2002

*Attest:*

*Attesting Officer*

JAMES E. ROGAN
*Director of the United States Patent and Trademark Office*